(12) United States Patent
Samii et al.

(10) Patent No.: US 10,102,085 B2
(45) Date of Patent: Oct. 16, 2018

(54) COORDINATED MULTI-MODE ALLOCATION AND RUNTIME SWITCHING FOR SYSTEMS WITH DYNAMIC FAULT-TOLERANCE REQUIREMENTS

(71) Applicant: GM GLOBAL TECHNOLOGY OPERATIONS LLC, Detroit, MI (US)

(72) Inventors: Soheil Samii, Royal Oak, MI (US); Thomas E. Fuhrman, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 259 days.

(21) Appl. No.: 15/246,803

(22) Filed: Aug. 25, 2016

(65) Prior Publication Data
US 2018/0060196 A1 Mar. 1, 2018

(51) Int. Cl.
*G06F 11/00* (2006.01)
*G06F 11/20* (2006.01)
*G06F 11/16* (2006.01)

(52) U.S. Cl.
CPC ...... *G06F 11/2005* (2013.01); *G06F 11/1658* (2013.01); *G06F 2201/805* (2013.01)

(58) Field of Classification Search
CPC .. G06F 11/2005; G06F 11/16; G06F 11/1658; G06F 11/20; G06F 11/2002; G06F 11/2097; G06F 11/3433; G06F 2201/805; G06F 9/505; G06F 9/5083; H04L 67/1004; H04L 67/1008; H04L 67/1029; H04L 67/1031; H04L 67/1034;
(Continued)

(56) References Cited

U.S. PATENT DOCUMENTS

2005/0172097 A1* 8/2005 Voigt ................. G06F 3/0613
711/170
2014/0160927 A1* 6/2014 Majumdar .......... H04L 47/10
370/235
(Continued)

OTHER PUBLICATIONS

Lu, Chenyang, Xiaorui Wang, and Xenofon Koutsoukos. "Feedback utilization control in distributed real-time systems with end-to-end tasks." IEEE Transactions on Parallel and Distributed Systems 16, No. 6 (2005): pp. 550-561. (Year: 2005).*

*Primary Examiner* — Bryce P Bonzo
*Assistant Examiner* — Anthony J Amoroso
(74) *Attorney, Agent, or Firm* — Quinn IP Law

(57) ABSTRACT

A method for dynamically re-allocating controller functions based on minimizing utilization. A lookup table is generated based on functions and mode of operations. Each entry in the lookup table includes a number of executions required for a respective function in a respective mode of operation. Functions for execution to the controllers are assigned based on the number of executions for a function of an entry of a respective mode of operation. A utilization rate is determined for each controller in each mode of operation. Utilization rates of the various modes of operation are compared for each of the controllers. Matching utilization rates are identified between controllers of different modes of operations. A multi-mode re-allocation of function execution in the controller is coordinated by switching a set of pre-allocated functions between different controllers within a respective mode of operation to reduce the utilization rate of at least one controller.

15 Claims, 7 Drawing Sheets

(58) Field of Classification Search
CPC . H04L 2012/40208; H04L 2012/40215; H04L 2012/4026; H04L 2012/40267; H04L 2012/40273; H04L 2012/4028; H04L 2012/40286; H04L 2012/40293
See application file for complete search history.

(56) References Cited

U.S. PATENT DOCUMENTS

| | | | |
|---|---|---|---|
| 2014/0201577 A1* | 7/2014 | Ohtake | G06F 11/0709 714/48 |
| 2015/0009804 A1* | 1/2015 | Koponen | H04L 41/0695 370/219 |
| 2015/0180719 A1* | 6/2015 | Wu | H04L 41/0896 709/224 |
| 2015/0296002 A1* | 10/2015 | Pell | G06F 9/505 709/226 |
| 2017/0066326 A1* | 3/2017 | Woodley | B60K 31/02 |
| 2017/0066441 A1* | 3/2017 | Woodley | B60W 50/023 |
| 2017/0066442 A1* | 3/2017 | Woodley | B60T 17/221 |

* cited by examiner

| Function | Controller X Mode Table | | | |
| --- | --- | --- | --- | --- |
| | L2 - Urban-Day | L3 - Highway-Day | L-4 Freeway - Day | L-2 Freeway-Night |
| Pedestrian Detection | Off | Off | Off | Off |
| Vehicle Detection | Off | Off | Off | Off |
| Lane Detection | Off | Off | Cold | Off |
| Traffic Light Detection | Off | Off | Off | Off |
| Traffic Sign Detection | Off | Off | Off | Off |
| Night-Vision Camera | Off | Off | Off | Primary |
| Path Planning | Primary | Primary | Hot | Off |
| Object Dynamics | Primary | Primary | Primary | Off |
| Lane Change | Primary | Primary | Primary | Primary |
| Deceleration Control | Hot | Hot | Hot | Hot |
| Propulsion Control | Off | Off | Cold | Primary |
| Lateral Control | Hot | Hot | Hot | Off |

COORDINATED MULTI-MODE ALLOCATION AND RUNTIME SWITCHING FOR SYSTEMS WITH DYNAMIC FAULT-TOLERANCE REQUIREMENTS

BACKGROUND OF INVENTION

An embodiment relates to fault tolerant control systems.

Systems which provide safety functions typically utilize redundant controllers to ensure safety by shutting down functions that have experienced a fault or failure. Such systems are known as fail-silent systems. If a fault is detected, controls are shut down for the feature and the feature will no longer be operable in the system.

Some systems try to implement control systems utilizing a fail-operational system where additional controllers are used to ensure that a safe operation can be continued for a duration of time, such as dual duplex controllers. If a first controller fails and falls silent, a second controller will be activated and all actuators will switch over to rely on requests from the second controller. Since controllers must execute different functions and redundancies depending on which critical functions are running, efficient utilization of a controller is desired since the both the functions and the number of backup controllers needed to execute those functions will depend on the redundancy mode for the respective function within each controller.

SUMMARY OF INVENTION

An advantage of an embodiment is the reconfiguration of functions based on the executed mode requirements within controllers. A system architecture pattern and switching protocol is applied for fail-operational applications with mixed and dynamic redundancy requirements. Cost efficiency is achieved by changing resource usage at runtime depending on the redundancy needs of the mode of operation. Controller consolidation is achieved on a subsystem thereby enabling cost efficient architectures.

An embodiment contemplates a method for re-allocating controller functions based on minimizing utilization. A lookup table is generated based on functions and mode of operations. Each entry in the lookup table includes a number of executions required for a respective function in a respective mode of operation. Functions for execution are assigned to the controllers based on the number of executions required for a function in a respective mode of operation. Each controller is designated as one of a primary status, backup status, or not executing status for each function. A utilization rate is determined for each controller in each mode of operation. A minimum utilization of each controller is determined across each modes of operation. The utilization rates of the various modes of operation are compared for each of the controllers. Matching utilization rates between controllers of different modes of operations are identified. A multi-mode re-allocation of function execution is coordinated in the controller by switching a set of pre-allocated functions between different controllers within a respective mode of operation to reduce the utilization rate of at least one controller.

BRIEF DESCRIPTION OF DRAWINGS

FIG. 3 illustrates a lookup table identifying a controller's status mode for each function based on the mode of operation.

DETAILED DESCRIPTION

Figure 1:
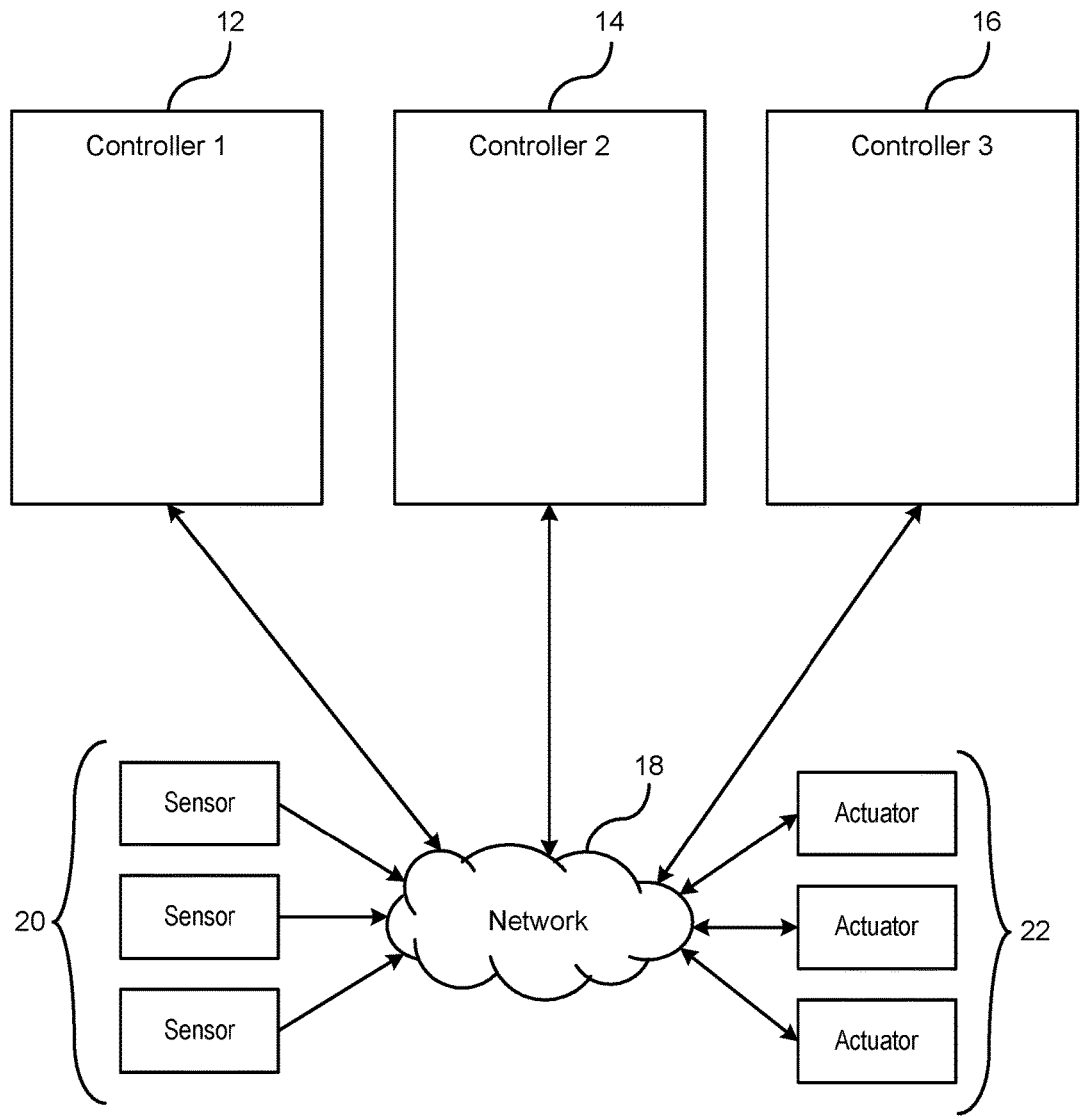
FIG. 1 an architectural block diagram of an exemplary integrated control system.

The following detailed description is meant to be illustrative in understanding the subject matter of the embodiments and is not intended to limit the embodiments of the subject matter or the application and the uses of such embodiments. Any use of the word "exemplary" is intended to be interpreted as "serving as an example, instance, or illustration." Implementations set forth herein are exemplary are not meant to be construed as preferred or advantageous over other implementations. The descriptions herein are not meant to be bound by any expressed or implied theory presented in the preceding background, detailed description or descriptions, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, (e.g., memory elements, digital signal processing elements, logic elements, look-up tables, or the like, which may carry out a variety of functions under the control of one or more microprocessors or other control devices).

When implemented in software, various elements of the systems described herein are essentially the code segments or computer-executable instructions that perform the various tasks. In certain embodiments, the program or code segments are stored in a tangible processor-readable medium, which may include any medium that can store or transfer information. Examples of a non-transitory and processor-readable medium include an electronic circuit, a microcontroller, an application-specific integrated circuit (ASIC), a semiconductor memory device, a ROM, a flash memory, an erasable ROM (EROM), a floppy diskette, a CD-ROM, an optical disk, a hard disk, or the like.

The system and methodology described herein can be utilized to maintain safety control functions in controllers executing software functions in control systems in a cost effective manner. While the approach and methodology are described below with respect to controllers used in vehicle applications, one of ordinary skill in the art appreciates that an automotive application is merely exemplary, and that the concepts disclosed herein may also be applied to any other suitable communications system such as, for example, general industrial automation applications, manufacturing and assembly applications, avionics, aerospace, and gaming.

The term "vehicle" as described herein can be construed broadly to include not only a passenger automobile, but any other vehicle including, but not limited to, rail systems, planes, off-road sport vehicles, robotic vehicles, motorcycles, trucks, sports utility vehicles (SUVs), recreational vehicles (RVs), marine vessels, aircraft, farming vehicles, and construction vehicles.

There is shown in FIG. 1 an architectural block diagram of an exemplary integrated control system. Such control systems will often utilize two controllers so that if a hardware error occurs with a primary controller, then a backup controller may be readily enabled to control a feature of the control system or provide control for limited functionality of the feature in error.

There is shown in FIG. 1 an architectural block diagram of an integrated fail-operational control system. Control systems, include, but are not limited to vehicles, planes, and ships that utilize safety-critical systems or autonomous systems, that require fault-tolerant countermeasures should an error occur within the control system. Such control systems will often utilize two or more controllers so that if an error occurs (which results from a fault) with a primary controller, then a backup controller may be readily enabled to control a feature of the control system or provide control for limited functionality of the feature in error.

In FIG. 1, a respective system is shown to include a first controller 12 (e.g., electronic control unit), a second controller 14, and a third controller 16. The exemplary system as described herein is vehicle based, but as described earlier, the architecture can apply to non-vehicular systems. Each of the controllers includes at least one central processing unit (CPU) for executing the software. Depending on the systems mode of operation, each controller may be enabled for executing functions by its CPU.

The first controller 12, the second controller 14, and the third controller 16 communicate via a communication network 18. It should be understood that the communication network may include, but is not limited to, Controller Area Network (CAN), CAN with Flexible Data-rate (CAN-FD), FlexRay, switched networking with Ethernet, wireless communication, or multiple networks using gateways. The requirement is that each of the controllers and sensors/actuators can communicate with one another. The first controller 12, the second controller 14, and the third controller 16 utilize the communication network 18 to receive and transmit data between sensors 20 and actuators 22.

Figure 2:
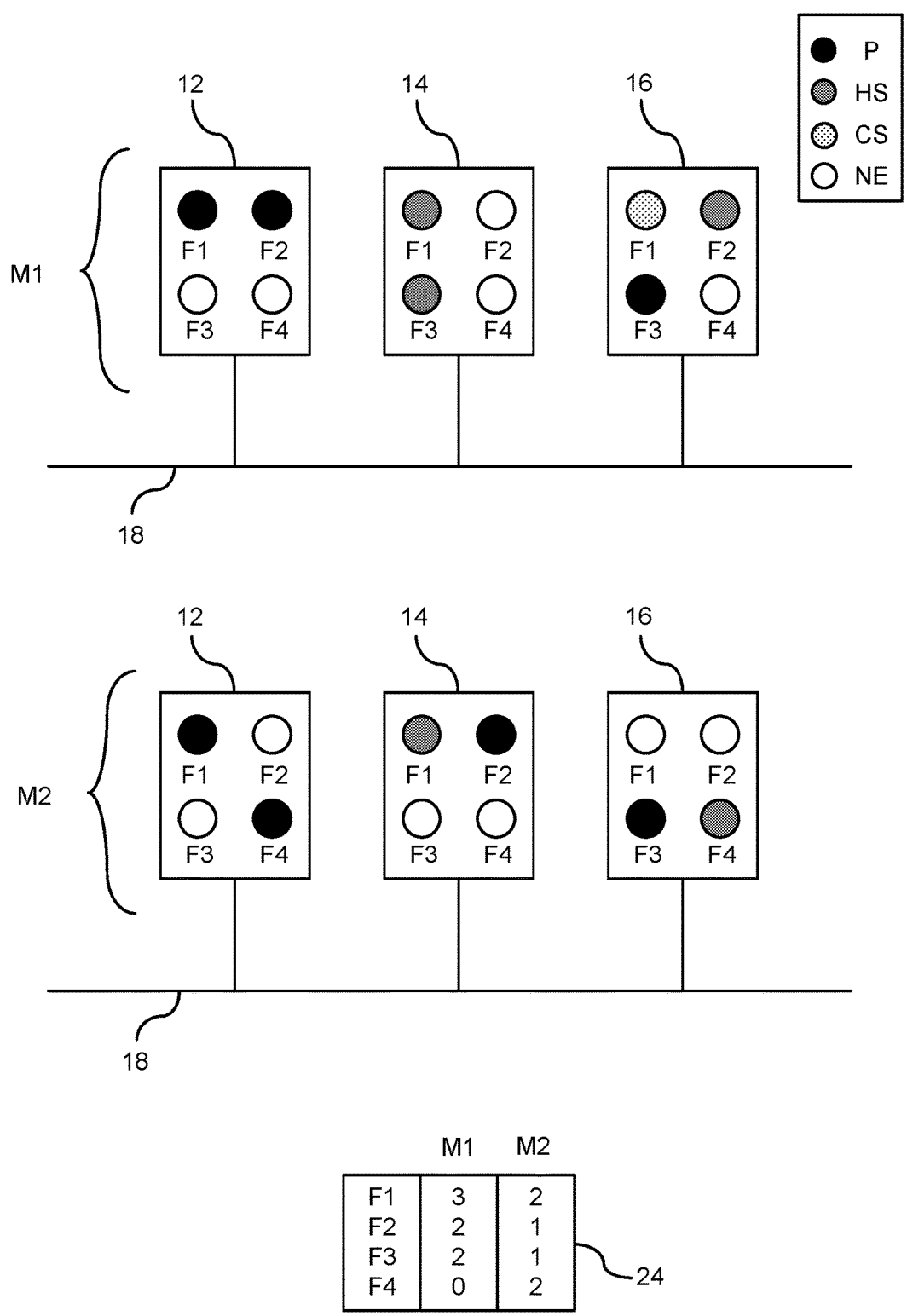
FIG. 2 illustrates controller configurations based on mode of operation.

FIG. 2 illustrates controller status and function execution by controllers in different modes of operation. For illustrative purposes herein, the first controller 12, the second controller 14, and the third controller 16 are identical with same hardware and same software. A redundancy table 24 is shown illustrating the required redundancies for each of the functions given the respective mode of operation and respective functions to be executed. For example, the redundancy table 24 indicates the number of required copies of each function. That is, the redundancy table 24 just indicates the number of controllers required (i.e., whether primary, backup, or no controllers required) for each function in each respective mode. Functions may include, but are not limited to, lane detection, pedestrian detection, vehicle detection, and path planning. The redundancy table 24 identifies whether a primary controller is needed for that function as well as the number of backup controllers required. In the exemplary redundancy table 24, each function F1, F2, F3, F4 is listed in the rows and the respective modes of operation are listed in the column. The modes of operation may include, for example, urban day driving, urban night driving, freeway day driving, freeway night driving. The redundancy table 24 identifies, for each function and each mode of operation, whether the primary controller will be utilized and the number of backup controllers that are required. For example, for mode of operation (M1) and function (F1), three independent executions are required. This indicates that one primary controller and two backup controllers are required when this respective function is executed under this mode of operation. Another example in the table is when the mode of operation is (M2) and the function is (F3), then one independent execution is required. This indicates that one primary controller and no backup controller are required. In yet another example, when the mode of operation is (M1) and the function is (F4), then zero independent executions are required. This indicates that neither a primary controller nor any backup controllers are required.

To enable each controller in their respective status modes for a mode of operation, each controller has stored in its memory a lookup table 25 as shown in FIG. 3. In utilizing the lookup table 25, the status of the respective controllers are illustrated as to how they are configured when functions are executed for a respective mode of operation. Each of the controllers may be designated either as one of a primary status mode (P), a hot standby status mode (HS), a cold standby status mode (CS), and a not executing status mode (NE). The primary status mode (P) indicates that a respective controller is designated as the primary controller for executing that function; the hot standby status mode (HS) indicates that a respective controller is designated as the first backup controller for that function; a cold standby status mode (CS) indicates that a respective controller is not active as a backup controller but is on standby to migrate to hot status mode (or directly to primary if desired by the system designer); and a not executing status mode (NE) indicates that the controller is not being utilized in any manner for that function in that mode. The switching and reconfiguring between primary status mode, hot standby status mode, and cold standby status mode for controller failures is described in co-pending applications having Ser. No. 15/078,233 filed Mar. 23, 2016 entitled Fault-Tolerance Pattern and Switching Protocol for Multiple Hot and Cold Standby Redundancies, which is incorporated by reference in its entirety. Switching between the primary status (P), hot status (HS), cold status (CS), and not executing (NE) occurs as a result of the mode of operation changes. As a result, each respective controller does not know the redundancies required of a respective function for a respective mode; rather, each respective controller will only know what its status mode is for each respective function under each respective mode of operation. However, it should be understood that controllers can communicate with one another for identifying failures and alerting other controllers as to their status and whether a status mode change is required. The lookup table for each controller is generated at design time. That is, when determining the allocation of each function and its replicas onto the controllers, and for each function and its replicas, the execution mode (primary, hot, cold, NE) is determined. Each controller will then have a table similar to lookup table 25 stored in its memory to look up the execution mode of each function/replica based on the mode of operation (e.g., M1 or M2).

Figure 4:
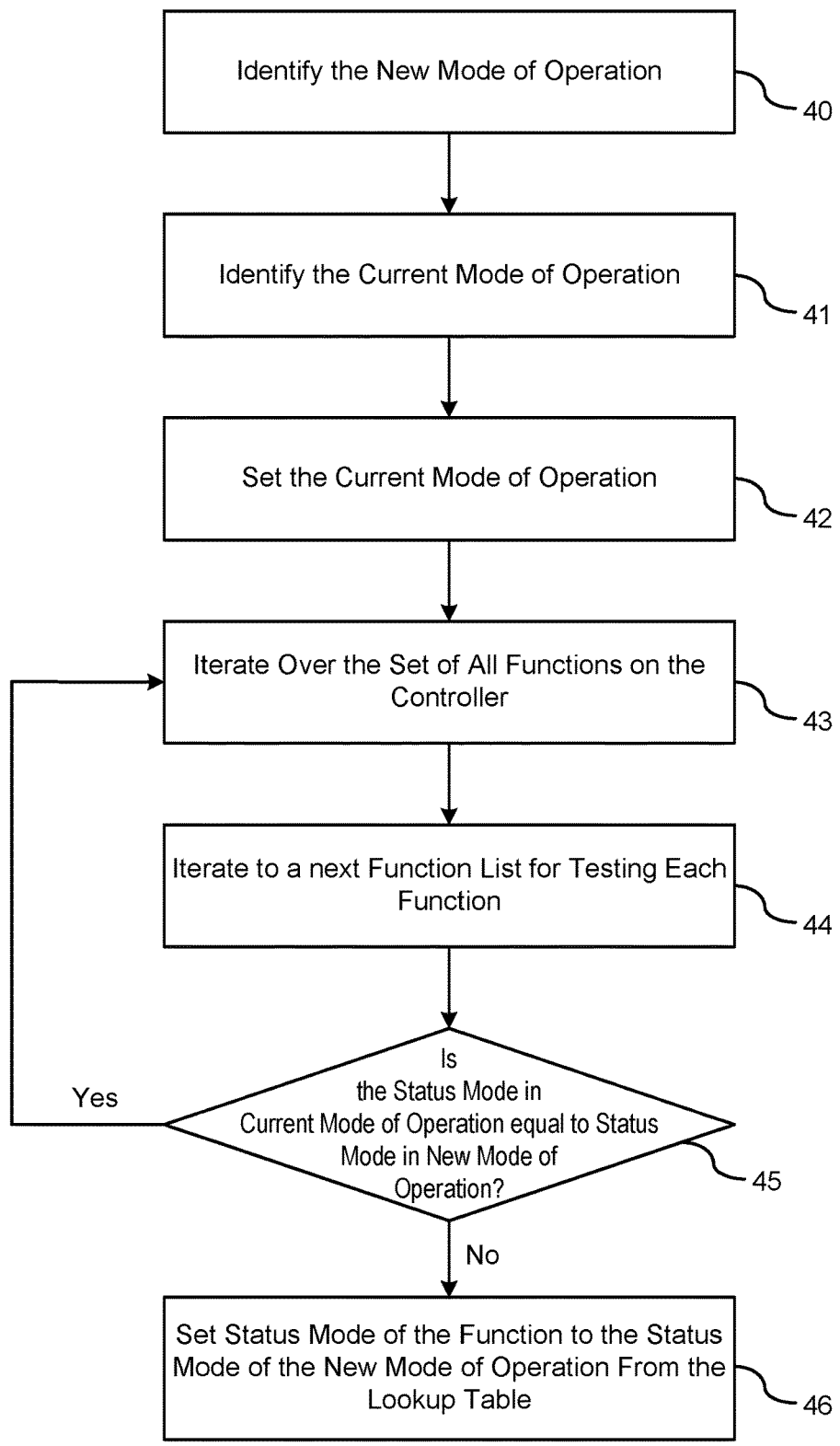
FIG. 4 illustrates a flowchart for transitioning to a new status mode based on the mode of operation.

FIG. 4 a flowchart for transitioning to a new status mode based on the mode of operation. In step 40, a new mode of operation is identified. In step 41, the current mode of operation is identified.

In step 42, the current mode is set.

In step 43, the routine iterates over the set of all functions on a controller. That is, each function is indexed to determine if the status mode needs to be changed based on the new mode of operation. If all functions have been tested between the different modes, then the routine terminates. If additional functions need to be tested, then the routine proceeds to step 44.

In step 44, a next function is identified for testing.

In step 45, a test is conducted to determine whether the status mode of the ECU for executing the identified function from the current mode of operation for the new mode is equal to the status mode of the ECU for executing the identified functions for the current mode of operation for the current mode. If the status modes are the same, a return is made to step 43 to iterate to a next function. If the status modes are not the same, then the routine proceeds to step 46. The lookup table is used to identify whether the status modes are equal based comparing a same function between the two different modes of operation in the lookup table.

In step 46, the status mode of the function for is set to the status mode of the new function as identified in the lookup table. The routine returns to step 43 to iterate to a next function.

As shown in FIG. 2, for function (F1) when operating in a mode of operation (M1), three controllers are required (i.e., 1 primary and 2 backups). As illustrated in FIG. 2, controller 12 is designated as a primary controller (P) for executing function (F1), controller 14 is designated as a backup controller operating in (HS) mode, and controller 16 is designated as a backup controller operating in (CS) mode. This configuration satisfies the requirements of the redundancy table for (F1) while operating in mode (M1).

For function (F4) when operating in systems mode of operation M2 where only two controllers are required, controller 12 is designated as the primary controller (P) for executing function (F4) and controller 16 is designated as the backup controller operating in (HS) mode. Controller 14 is not designated (NE) as a backup controller for (F4) operating in mode (M2).

For function (F3) operating in mode of operation (M1) where only two controllers are required, controller 16 is designated as the primary controller (P) whereas controller 14 is designated as the backup controller operating in (HS) mode. Controller 12 is not required and is not designated as a backup. As also illustrated in the FIG. 2, each of the controllers are configured to execute or not execute functions while operating in (M2) and their associated designation are identified as to whether each is a primary, backup, or not utilized as illustrated.

For a distributive approach, a respective lookup table is individualized for each controller and each individualized lookup table is stored in a memory location of each controller. If a centralized approach is utilized, then the lookup tables for all controllers are stored in a single controller designated as the coordinating controller. In the centralized approach, the coordinating controller implements the status mode changes for all controllers. The coordinator controller notifies each controller by controller messages via the communication network to switch functions to another status mode. Should the coordinator controller have a fault, then a backup coordinator controller is enabled to function as the coordinator controller. Selection of the backup coordinator controller may be performed by a distributed agreement protocol or by a statically defined order. Synchronization of the current coordinator controller and the backup coordinator controller is communicated to one another via the communication network all of which is described in co-pending application entitled Tolerance Pattern and Switching Protocol for Multiple Hot and Cold Standby Redundancies having Ser. No. 15/078,233 filed Mar. 23, 2016, which is incorporated by reference in its entirety.

Figure 5:
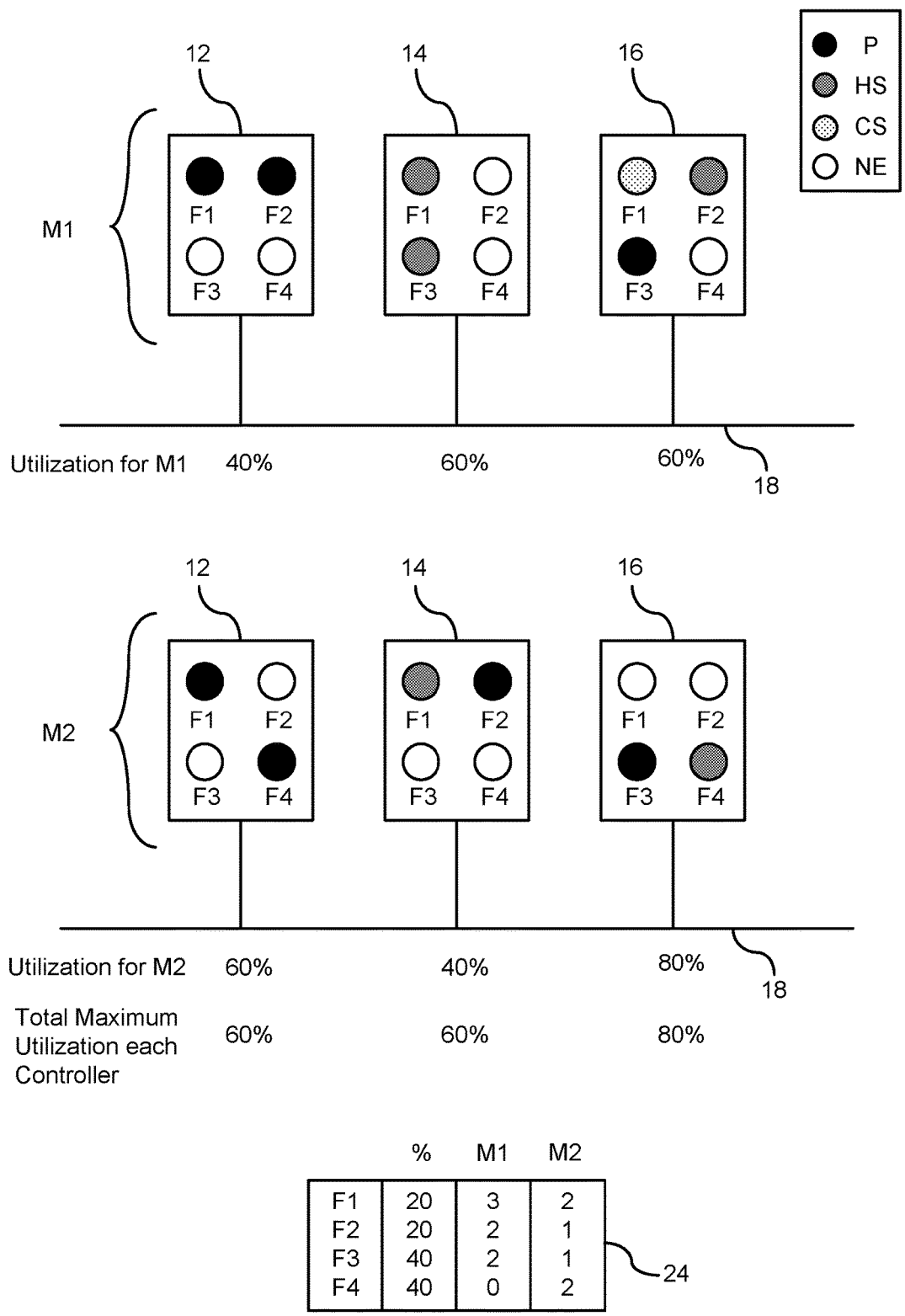
FIG. 5 illustrates controller configurations based on mode of operation and utilization rates.

FIG. 5 illustrates an initial configuration for each of the controllers along with the lookup table illustrating whether function execution is required by a respective controller for each mode of operation. Also shown is a utilization percentage of the each of the controllers based on the allocation of each function. Utilization of each mode of operation is illustrated for each controller. For mode of operation (M1), controller 12 is utilized 40%, controller 14 is utilized 60%, and controller 16 is utilized 60%. For mode of operation (M2), controller 12 is utilized 60%, controller 14 is utilized 40%, and controller 16 is utilized 80%. The maximum utilization for each controller based on modes of operation (M1 and M2) is 60% for controller 12, 60% for controller 14, and 80% for controller 16. The issue as shown herein is that respective controllers do not operate at the same utilization rate between the two modes of operation. For example, even though controller 12 is utilized only 40% of the time when executing functions for (M1), controller 12 still operates 60% of the time when executing functions for (M2). Therefore, the total maximum utilization time for controller 12 is 60%. Similarly, controller 14 operates 60% of the time when executing functions for (M1), but 40% of the time when executing functions for (M2). Therefore, the total maximum utilization time for controller 14 is 60%. The total maximum utilization determines the dimensioning of hardware resources for each controller. Also shown in FIG. 5 is the redundancy table 24 which includes the utilization for each software function. The utilization of each controller may be determined by adding the utilization rate of each function. Utilization for each controller for a function is only added if the function is in a primary status or a hot status. For example, for controller 12 in mode M1, functions F1 and F2 are in primary status mode. Functions F3 and F4 are in NE mode and are not utilized. Therefore, utilizing the redundancy table 24, F1 and F2 combine for 40% utilization. In another example, for controller 16 in mode M1, functions F2 and F3 are in hot status and primary status mode, respectively. F1 is in cold status mode and F4 which is in NE status mode which both are not utilized. As a result, the total utilization rate for controller 16 in M1 is 60%.

Figure 6:
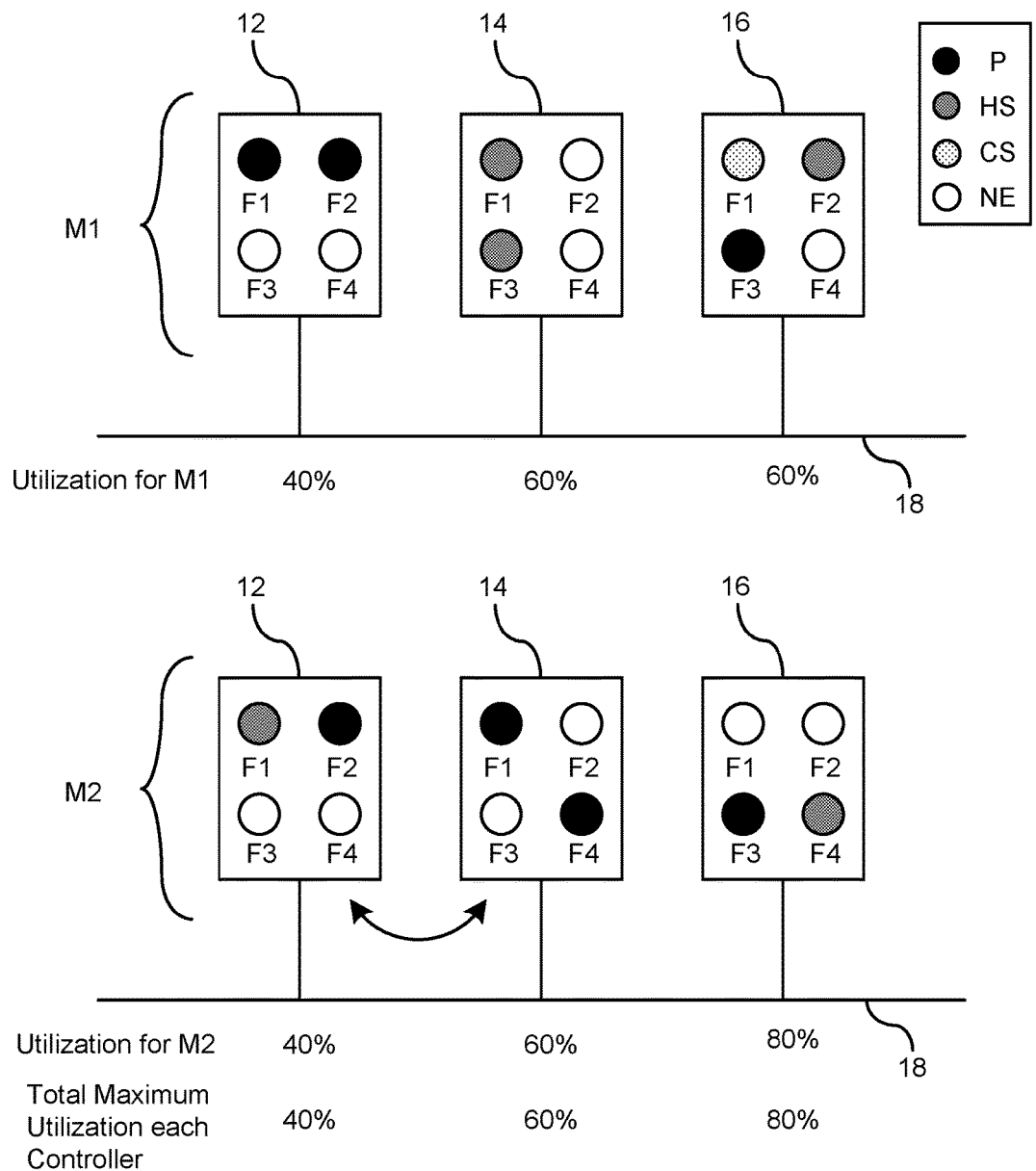
FIG. 6 illustrates controller re-allocation based on coordinating utilization rates.

FIG. 6 illustrates a re-allocation of the execution of a set of functions between two or more controllers utilizing a coordinated heuristic switch technique. By re-allocating the execution of the set of functions between two controllers, efficiency by way of minimizing utilization within at least one controller can be obtained. Referring to FIG. 5, the functions executed in the first controller for (M1) includes a utilization of 40% and the set of functions executed in the second controller includes a utilization of 60%. In addition, the functions executed in the first controller for (M2) includes a utilization of 60% and the set of functions executed in the second controller include a utilization of 40%. By re-allocating the set of functions between controller 12 and controller 14 for (M2), controller 12 operates at 40% utilization in mode (M1) and 40% utilization in mode (M2) as shown in FIG. 6. As a result, a maximum utilization rate of 40% is obtained for controller 12 in both modes, which is a 20% utilization reduction for the overall system. It should be noted that although functions have been re-allocated between controllers, the execution requirement of functions in the lookup table 25 remains unchanged and the reconfiguration still satisfies the execution requirement.

Figure 7:
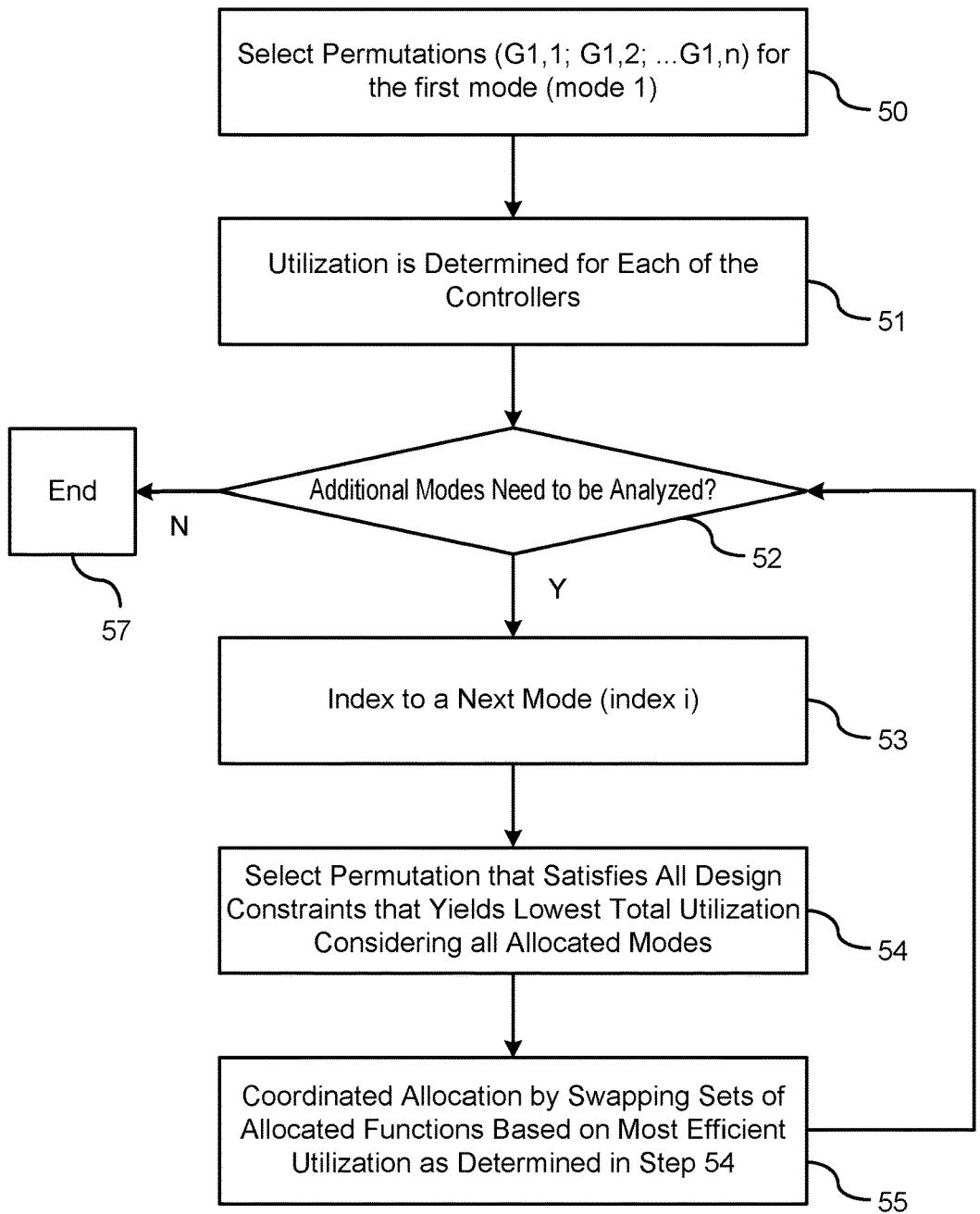
FIG. 7 illustrates a flowchart for a method of coordinating multi-mode allocation for runtime switching.

FIG. 7 illustrates a flowchart for a method of coordinating multi-mode allocation for runtime switching.

In step 50, we select permutation (G1,1; G1,2; . . . ; G1,$n$) as the allocation for all controllers for the first mode (mode 1). The notation Gi,j indicates the allocation of functions in Mode i on Controller j. Note that each Gi,j is given as an input to the algorithm and can be determined based on any state-of-the-art software allocation algorithm. Thus, i is the index for modes (there are m modes) and j is the index for controllers (there are j controllers). In an improved variant of the algorithm, all permutations (G1,1; G1,2; . . . ; G1,$n$) are identified for each controller in mode 1 and the entire flowchart is executed for each such permutation, giving the initial allocation for mode 1.

In step 51, a utilization is determined for each of the controllers based on the utilization of each controller executing the functions in the first mode.

In step 52, a determination is made as to whether all modes have been evaluated. If all modes have been evaluated, then the program advances to 57 where the routine ends and the lookup tables are generated; otherwise the routine proceeds to step 53.

In step 53, the mode is indexed to a next mode (mode i). The routine will start with mode 1 and then indexes to a next mode as the routine loops.

In step 54, a permutation of (Gi,1; . . . ; Gi;n) is selected that satisfies all design constraints and yields the lowest total utilization considering the current utilization of the controllers based on the already allocated modes. That is, a coordinated determination is made to identify the minimum utilization for each controller for the mode under determination, coordinating with the allocations that have already been determined for the previous modes of operation. All permutations of (Gi,1, Gi,2, . . . , Gi, n) are explored in this step.

In step 55, a coordinated allocation is performed where sets of allocated functions designated for the controllers are swapped based on the permutation that was selected in the previous step (this selected permutation has been chosen to yield the most efficient total utilization for each controller across each of the indexed modes). As shown in FIG. 6, the total utilization for each controller across each mode is determined by swapping the allocation of functions between controllers and generating a lowest total utilization for one or more controllers based on the set allocations between each of the modes. For example, if the permutation (Gi,3, Gi,1, Gi,2) is selected, then swapping is performed to yield the following allocations:

Allocation of controller 1 is assigned to Gi,3 for mode i (i.e., the original allocation of controller 3, for mode i);

Allocation of controller 2 is assigned to Gi,1 for mode i (i.e., the original allocation of controller 1, for mode i); and Allocation of controller 3 is assigned to Gi,2 for mode i (i.e., the original allocation of controller 2, for mode i).

A return is made to step 52 to determine if more modes require analysis.

After the algorithm terminates, yielding allocations of functions and determination of their respective statuses on each controller for each mode of operation, the lookup table is generated for each controller and each lookup table is stored in a memory of the respective controller that it is designated. Alternatively, all lookup tables may be stored in a coordinating controller where a centralized approach is performed for executing the functions in the various modes.

While certain embodiments of the present invention have been described in detail, those familiar with the art to which this invention relates will recognize various alternative designs and embodiments for practicing the invention as defined by the following claims.

What is claimed is:

1. A method for re-allocating controller functions based on minimizing utilization, the method comprising the steps of:
generating a lookup table based on functions and mode of operations, each entry in the lookup table including a number of executions required for a respective function in a respective mode of operation;
assigning functions for execution to a plurality of controllers based on the number of executions required for a function in a respective mode of operation, each controller being designated as one of a primary status, backup status, or not executing status for each function;
determining a utilization rate for each controller in each mode of operation;
determining a minimum utilization of each controller across each modes of operation;
comparing the utilization rates of the various modes of operation for each of the controllers;
identifying matching utilization rates between controllers of different modes of operations; and
coordinating a multi-mode re-allocation of function execution in each controller by switching a set of pre-allocated functions between different controllers within a respective mode of operation to reduce the utilization rate of at least one controller.

2. The method of claim 1 wherein the lookup tables are predetermined.

3. The method of claim 2 wherein the functions within each controller are initially pre-allocated to each controller.

4. The method of claim 1 wherein comparing the utilization rates for each of the controllers is determined based on the utilization of the controllers between the different modes of operation.

5. The method of claim 1 wherein identifying matching utilization rates includes identifying an exact match of utilization rates between controllers of different modes of operation.

6. The method of claim 1 wherein identifying matching utilization rates includes identifying the lowest utilization rates among the controllers in the different modes of operation.

7. The method of claim 1 wherein each controller stores the lookup tables in a memory.

8. The method of claim 1 wherein lookup tables are stored in a memory of a single controller.

9. The method of claim 8 wherein the controller storing the lookup table is designated as a primary coordinator controller, wherein the primary coordinator controller implements status mode changes for all controllers.

10. The method of claim 9 wherein the primary coordinator controller notifies each controller by controller messages via a communication network to switch functions to another controller.

11. The method of claim 10 wherein in response to a failure in the primary coordinator controller, a backup coordinator controller is enabled to function as the primary coordinator controller.

12. The method of claim 11 wherein the backup coordinator controller enabled to function as the primary coordinator controller is determined by a distributed agreement protocol.

13. The method of claim 12 wherein the backup coordinator controller enabled to function as the primary coordinator controller is determined by a statically defined order.

14. The method of claim 13 wherein the primary coordinator controller and the backup coordinator controller communicate via the communication network to synchronize states.

15. The method of claim 1 wherein a unique lookup table is generated for each controller identifying the status modes of the controller for each function and within each mode of operation, each lookup table within each controller being utilized by each controller for coordinating a respective status mode change of each controller.

* * * * *